Nov. 8, 1955 A. FRUM 2,723,310

TIME MULTIPLEX SYSTEM

Filed Nov. 10, 1947 2 Sheets-Sheet 1

INVENTOR.
ALEXANDER FRUM

BY

R P Morris

ATTORNEY

Nov. 8, 1955 A. FRUM 2,723,310

TIME MULTIPLEX SYSTEM

Filed Nov. 10, 1947 2 Sheets-Sheet 2

INVENTOR.
ALEXANDER FRUM

BY

R P Morris
ATTORNEY 2,723,310

TIME MULTIPLEX SYSTEM

Alexander Frum, Far Rockaway, N. Y., assignor to International Standard Electric Corporation, New York, N. Y., a corporation of Delaware Application November 10, 1947, Serial No. 785,010

9 Claims. (Cl. 179—15)

This invention relates to radiant energy communication systems and more particularly to multiplex systems of the type employing pulses in which the spacing between consecutive pulses representing respective channels is indicative of the intelligence conveyed in such channels.

In systems for communicating intelligence by means of multiplex communication channels employing pulse modulation proposed heretofore, the individual channels generally are characterized by having assigned to them a time element of constant duration and of a definite relative time position. Signalling in each channel is effected by a variation in the amplitude, the width, or the time position of the respective channel pulse within the allotted time element relative to a marker or code pulse.

In view of the fact that such pulses have to be transmitted over media passing only a limited band of frequency, the consequence is such that pulses are frequently affected by those preceding them due to the proximity of the trailing edges of such preceding pulses in respect to the leading edge of the following one. Undesirable cross-talk arises between the various channels of the system. This cross-talk is of course greater for adjacent channels, the requirement for maximum time displacement of the pulses due to modulation having to contend with the requirement for conditions of minimum cross-talk.

It is an object of the present invention to provide a multiplex pulse modulation system which overcomes the above objections and reduces undesirable cross-talk between individual channels and thereby increasing the channel capacity of the system.

It is a further object of the invention to provide a system of the type referred to wherein the intervals between successive and contiguous channel pulses are modulated in accordance with the prevailing signal amplitude of the preceding channel.

A still further object of the invention is to provide a multiplex pulse interval modulation system of the above type which utilizes cathode ray distributors both for the transmitting and receiving ends of the system.

In accordance with certain features of the invention, the signal intensity of successive channels is made to modulate the interval between the transmitted pulses. This is achieved at the transmitting end by causing the signal intensity of the successive channels to be integrated with time and the integrated voltage to be fed back to the deflecting system of a cathode ray distributor, e. g. of the type known as "Cyclophon," whereby the time of scan across the target plate of the distributor is proportional to the channel intensity acting on the beam. By differentiation, a series of interval modulated pulses is obtained for transmission. In the receiver, demodulation takes place when the received pulses are applied to an integrator circuit, the staircase type output of which supplies the deflection voltage for the cathode ray distributor or "Cyclophon" in the receiving system. The successive pulses are made to move the cathode ray beam step-wise from one channel dynode to the next. Thus the relative spacing of the pulses determines the time for which the beam remains on each dynode, thereby determining the width of the pulses applied to the dynode and the resulting signal energy imparted to the associated receiving channel.

These and other objects and features of the present invention will become apparent and the invention will be best understood from the following description of the embodiments thereof, reference being had to the drawings in which.

Figure 1:
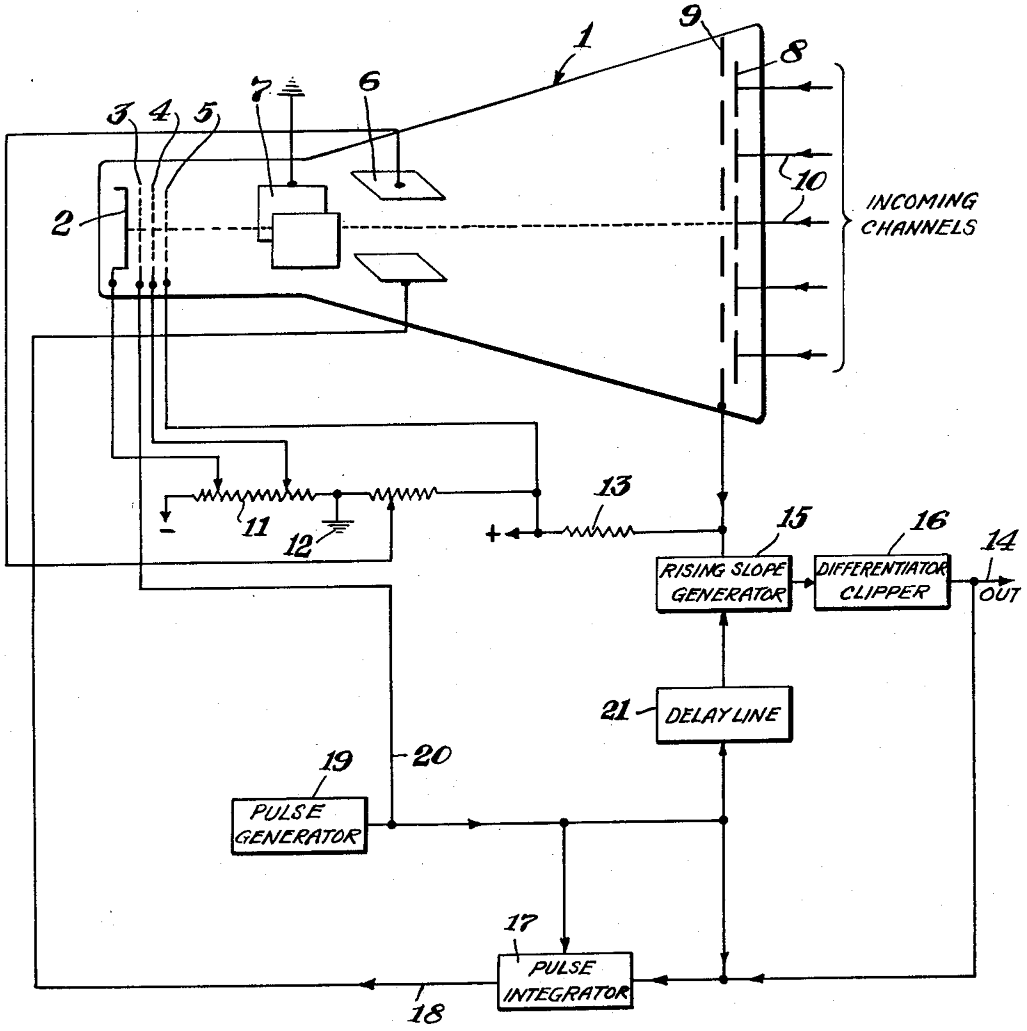
Fig. 1 is a view partly in schematic form of a transmitter for the communication system employing the present invention.

Referring to Fig. 1, the transmitter shown therein comprises a cathode ray distributor or "Cyclophon" 1, which includes an electron gun arrangement comprising a cathode 2, a plurality of grids 3, 4 and 5, horizontal deflection plates 6, and vertical deflection plates 7. The distributor further includes a plurality of targets for the electron beam indicated at 8 and an aperture plate or common dynode return 9. The arrangement of the targets behind the aperture plate may be in a single line, as shown, radially disposed in a circle or in a parallel and linear arrangement in accordance with well known methods. For purposes of simplicity it will be assumed that the dynodes are arranged in a single line. The number of targets and apertures in the aperture corresponds to the number of modulating channels utilized with the understanding that one of the targets may be used to provide a synchronizing or code pulse, as is common practice, at a given rate. As shown in Fig. 1, each of the targets 8 connects with a corresponding modulating channel over a connection 10. Suitable biasing voltages are provided for the distributor electrodes by means of a potentiometer 11 which is grounded at point 12 and which includes a distributor output resistance 13 in the connection from the dynode return 9 to the positive end of the potentiometer 11. The output signals for the respective channels obtained across the resistance 13 are applied to an outgoing line 14 connecting with a suitable transmitter (not shown) by way of a rising slope generator 15 including a variable amplitude limiter controlled by the signals across 13 and a differentiator circuit 16, the effect of which will be described in connection with the graphs of Fig. 2. The outgoing pulses from the differentiator 16, which circuit also includes a clipping means, are also supplied to a pulse integrator 17 which serves as a sweep voltage source for the horizontal deflection plates 6 of the distributor. The integrated voltage which is of the staircase form, controls the deflection of the beam by way of a connection 18 between the integrator 17 and the deflection plates 6.

When the beam has reached the end of the line of dynodes, the integrating circuit 17 is caused to be discharged by pulses from a device 19. The device 19 is comrpised of a base wave or synchronizing pulse generator which supplies a starter pulse which controls the sweep of the cathode ray beam at the beginning and end of the line of dynodes.

A connection 20 is shown between the starter pulse circuit 19 and control grid 3 to insure so-called fly-back suppression as a function of the discharge trigger.

Figure 2:
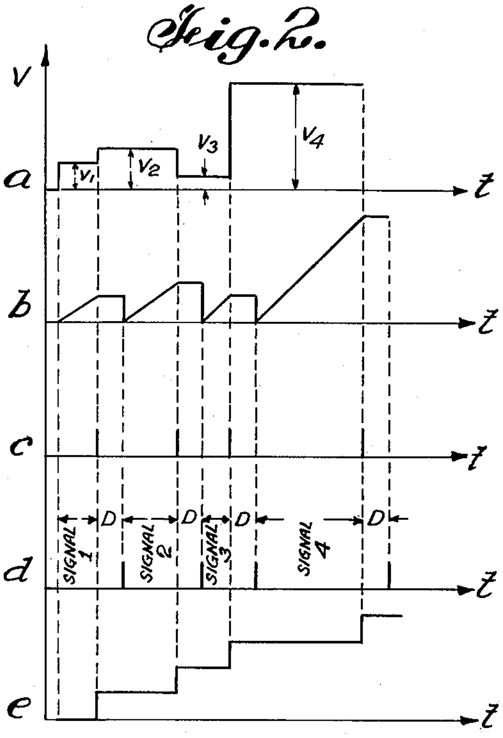
Fig. 2 is a series of graphical representations of voltage conditions encountered in the system.

The generator 19 also controls the action of the rising slope generator 15 by way of a delay line 21, which generator 15 is also supplied with delayed output pulses as will become clear in connection with an inspection of the graphs of Fig. 2. The vertical deflection control plate 7 may be used when a two-dimensional array of the dynodes is being employed and vertical deflection is required.

Figure 3:
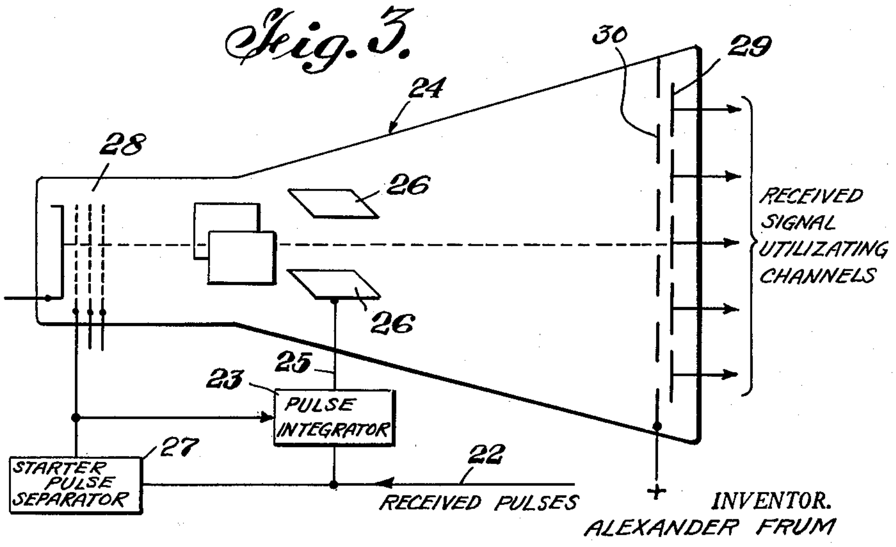
Fig. 3 is a view also partly schematic of a demodulator for the receiver of the system.

In the demodulator shown in Fig. 3 which forms a part of the associated receiver of the communication system described, incoming pulses are applied at 22 to a first pulse counter or integrator circuit 23 the output of which rises by an equal step for each pulse, the duration of the steps being equal to the signal indicating separation between pulses. This step voltage is made to control the horizontal deflection of a demodulation "Cyclophon" or distributor 24, a connection 25 being provided between the integrator 23 and horizontal deflection plates 26. Thus, each step will cause the beam to move from one dynode to the next. When the counter has stepped as many times as there are dynodes in a line it may be discharged by a pulse from a starter or synchronizing pulse separator 27 which as its name implies serves to separate out the synchronizing pulses from the train of multichannel pulses received. In another method, not illustrated here, the integrator 23 when a trigger threshold is reached will be discharged, causing the beam to fly back. The starter pulse separator 27 is connected to control grid 28 causing it to act to provide fly-back suppression. The vertical deflection plates are now in use although, of course, both the vertical and horizontal plates will be employed when two-dimensional scanning is required. A series of targets for the distributor 24 is indicated at 29 and the associated dynodes or aperture plate at 30.

Discussing the operation of the system with particular reference to the graphs of Fig. 2, the output pulses corresponding to the respective channels across resistance 13 (Fig. 1) are amplitude modulating according to signal intensity and also width modulated to the same degree as a result of the variable scan, the width modulation being the desired effect. These take a form substantially as shown in graph *a*. The pulses, before being applied to the outgoing line 14, as already stated, are passed through a clipper and differentiator resulting in a desired interval-modulated, constant width pulse series indicated in graph *c*.

The function of the starter pulse is to discharge the pulse integrator 17, whose output is the beam deflection voltage whereby the beam is returned to the first dynode. The starter pulse also keys the grid 3 for the fly-back suppression.

In addition, the starter pulse initiates a sweep of the rising slope generator 15. The presence of the beam on the first dynode generates a secondary emission current flowing through resistance 13 so that the resultant voltage $V_1$ (graph *a*) is proportional to the signal in the first channel. The value of $V_1$ also sets the clipping level for the rising slope (graph *b*). When the slope reaches an amplitude corresponding to $V_1$ i. e. after a time interval proportional to the $V_1$ amplitude, the clipper differentiator 16 yields an output pulse which is the channel pulse of the first channel, and whose spacing from the marker conveys the intelligence of the signal in the channel. The outgoing pulse is also applied to the pulse integrator 17 which causes the beam to move to the second dynode, whereby the voltage becomes $V_2$ which is proportional to the signal in the second channel. The resulting staircase type output of the pulse integrator 17 is shown in graph *e*. After a delay D (graph *c*), equal to the minimum desired spacing between consecutive pulses the first outgoing pulse initiates another rising slope, which is clipped after a time proportional to channel signal 2, thus resulting in emission of channel pulse 2, etc. The pulses which initiate the rising slope generator are shown in graph *d*.

It is thus seen that once the starter pulse sets off the first pulse, the subsequent pulses are set off by the preceding pulses, the spacing between pulses being related to the signal value of such preceding channels.

It is apparent that the interval modulation here shown may take place as between leading and trailing or as between trailing and leading edges of successive pulses as desired within the scope of the invention. The pulses obtained across the resistor 13 are also applied to the integrator 17 so as to effect a subtraction thereof and after passing through the integrator appear in the form as shown in graph *e*.

At the receiver, as already explained in connection with the demodulator of Fig. 3, each received pulse moves the cathode ray beam stepwise from one dynode or channel contact to the next, the relative spacing of the pulses determining the time for which the beam remains stationary on each dynode, and thereby the width of the pulses applied to the dynode and the signal finally obtained in the corresponding channel. The stepwise increase in the voltage of the pulse integrator 23 is substantially similar to that shown in graph *e*.

While I have described above the principles of my invention in connection with specific apparatus, it is to be clearly understood that this description is made only by way of example and not as a limitation on the scope of my invention.

What is claimed is:

1. An electronic pulse transmitter for a time modulation pulse system of communication comprising a plurality of modulating channels, means for cyclically applying energy to each of said channels, means for modulating the applied energy in accordance with the prevailing signal of the corresponding channel, means for transmitting energy in accordance with the signals of said respective channels, cathode ray means for periodically connecting each of said channels and said transmitting means, output circuit means for said cathode ray means, and means for controlling the velocity of the sweep of the cathode ray beam past said channels in accordance with the modulating signal in the respective channel connected to said output circuit.

2. A transmitter according to claim 1, wherein said controlling means comprises a pulse integrator.

3. A transmitter according to claim 1, further including an amplitude limiter and a differentiator intermediate said transmitting means and said output circuit.

4. An electric pulse transmitter for a time modulation pulse system of communication comprising a plurality of modulating channels; a cathode ray type electronic distributor having an electron gun including deflection control members for producing a cathode ray beam, a plurality of electron beam targets corresponding to and connected to said channels, an aperture plate associated with said targets to generate a flow of current in conjunction therewith; output circuit means for said aperture plate, a rising slope generator for said output means, means for differentiating the voltage of said generator, means for integrating the voltage of said differentiator circuit, means for applying the integrated voltage to said slope generator to control the operation thereof, means for applying the integrated voltage of said output circuit to control the sweep of the cathode ray beam past said target, and means for transmitting energy connected to said differentiator.

5. A transmitter according to claim 4, further including means for applying a discharge voltage to said integrating means.

6. A transmitter according to claim 4, further including pulse delay means intermediate said differentiator and said slope generator for operatively controlling said slope generator.

7. A radiant energy receiver for multi-channel pulse time communication system, comprising means for receiving a train of pulses having synchronizing signals and pulses for individual communicating channels, means for separating the synchronizing signals from the received pulse train, means for integrating the received pulses, a plurality of signal translating channels, electronic switch means intermediate said integrator and said channels, and means for controlling said switch means from said integrator.

8. A receiver according to claim 7, further including means for discharging said integrator from said separator.

9. A radiant energy system for multi-channel pulse time communication comprising a transmitter including a plurality of modulating channels, means for providing a pulse corresponding to each of said channels, means for controlling the spacing of succeeding pulses in response to the signal amplitude of the respective preceding channels, means for transmitting time modulated pulse energy, electronic switch means intermediate said channels and said transmitting means and second means for controlling said switch means from said first named control means; means for receiving said time modulated pulses, a plurality of signal translating channels, means for integrating said received pulses, and electron switch means intermediate said channels and said integrator under control thereof.

References Cited in the file of this patent

UNITED STATES PATENTS

| | | |
|---|---|---|
| 1,848,839 | Ranger | Mar. 8, 1932 |
| 2,036,350 | Montani | Apr. 7, 1936 |
| 2,419,292 | Shepard | Apr. 22, 1947 |
| 2,418,116 | Grieg | Apr. 1, 1947 |